_United States Patent_ [19]

Campbell

[11] 4,327,248
[45] Apr. 27, 1982

[54] SHIELDED ELECTRICAL CABLE
[75] Inventor: Larry J. Campbell, Kent, Ohio
[73] Assignee: Eaton Corporation, Cleveland, Ohio
[21] Appl. No.: 194,317
[22] Filed: Oct. 6, 1980
[51] Int. Cl.³ .............................................. H01B 7/18
[52] U.S. Cl. ................................... 174/107; 156/203;
156/280; 174/36; 174/102 R; 174/110 N
[58] Field of Search ................. 174/23 R, 36, 102 R,
174/102 D, 106 R, 106 D, 105 R, 107, 110 R,
110 N, 110 PM, 122 G; 428/461; 156/203, 218,
280, 244.13, 244.19, 250, 344

[56] References Cited
U.S. PATENT DOCUMENTS

| | | | |
|---|---|---|---|
| 3,233,036 | 2/1966 | Jachimowicz | 174/107 |
| 3,272,912 | 9/1966 | Jachimowicz | 174/107 |
| 3,379,821 | 4/1968 | Garner | 174/36 |
| 3,551,586 | 12/1970 | Dembiak et al. | 174/107 |
| 3,634,606 | 1/1972 | Iyengar | 174/106 D |
| 3,903,354 | 9/1975 | Dageförde | 174/107 |
| 3,943,271 | 3/1976 | Bahder et al. | 174/102 D |
| 4,042,776 | 8/1977 | Matsuba et al. | 174/110 R |
| 4,125,739 | 11/1978 | Bow | 174/36 |

_Primary Examiner_—Volodymyr Y. Mayewsky
_Attorney, Agent, or Firm_—R. J. McCloskey; A. E. Chrow

[57] ABSTRACT

Tubing and electrical cable utilizing shields made from a flexible metal tape that has a coating of a copolymer of ethylene with a monomer having a reactive carboxyl group bonded to at least one of its sides and to which coating is bonded an adhesive that is adapted to bond the coating to flexible or semi-rigid non-olefinic polymeric materials so as to provide such tubing and electrical cable with improved flexibility and resistance to wrinkling or bending.

13 Claims, 3 Drawing Figures

SHIELDED ELECTRICAL CABLE

INTRODUCTION

This invention relates generally to tubing and electrical cable shields made from flexible metallic tape and more particularly to tubing and electrical cable shields made from flexible metallic tape that has a coating bonded to at least one of its sides that is made from a copolymer of ethylene with a monomer having a reactive carboxyl group such as acrylic acid or an acrylic acid ester and the utilization of an adhesive to bond the coated metal tape to flexible or semi-rigid non-olefinic polymeric materials.

BACKGROUND OF THE INVENTION

Flexible metal tape suitable for use in tubing and electrical cable shields and having at least one of its sides coated with a copolymer of ethylene and a monomer having a reactive carboxyl group, such as disclosed in U.S. Pat. No. 3,795,540, are well known in the art. Examples of an 8 and 12 mil aluminum tape coated on both sides with approximately 2 mils of a copolymer of ethylene and a monomer having a reactive carboxyl group suitable for use in the present invention are respectively sold under part numbers A282 and XO-5554.07 under the Trademark "Zetabon" by Dow Chemical Company.

Examples of shielded electrical cable or tubing utilizing metal tapes having the previously described adhesive on one or both of its sides are disclosed in U.S. Pat. Nos. 3,233,036; 3,272,912; 3,332,138 and 3,379,821. Such tapes proportedly provide mechanical protection and electrical shielding characteristics and such coating proportedly provides the metal with improved resistance to corrosion and, where spiralled or longitudinally folded into a tubular form and suitably bonded the overlap, are able to provide an effective gas and moisture barrier. The presence of a reactive carboxyl group in the ethylene copolymer coating proportedly enhances chemical bonding in a moist corrosive atmosphere and enables polyolefinic materials, such as polyethylene, to be effectively bonded to the tape.

Although metallic tapes having at least one side coated with a copolymer of ethylene and a monomer having a reactive carboxyl group may be used to advantage in products such as disclosed in the previously described references, it has been found that flexible or semi-rigid non-olefinic amorphic polymers such as polyvinyl chloride and polyurethane and substituted polyolefins such as halogenated polyethylene of which an example is chlorinated polyethylene and chlorosulfonated polyethylene such as sold under the trademark Hypalon being E. I. DuPont de Nemours do not bond well to the ethylene and monomer copolymer coating and as such have heretofor been unable to be used in conjunction with such tapes in an adhesively bonded relationship.

There are many instances in both tubing and electrical cable shielding where it is desirable to bond flexible or semi-rigid non-olefinic polymeric materials directly to the ethylene and monomer copolymer coating and thereby bond the metal tape to such polymers in order to utilize the greater flexibility and other desirable characteristics generally associated with such polymers and to minimize or eliminate wrinkling of such polymers upon the bending of tubing and electrical cable products in which they are used. Since flexible and semi-rigid non-olefinic polymeric materials in general are able to be effectively compounded for flame retardancy and remain more flexible than similar compounds made from olefinic polymers, such as polyethylene and polypropylene, the present invention also provides a method by which flexible or semi-rigid flame retardant non-olefinic polymeric materials, such as polyvinyl chloride, are able to be bonded to flexible metal tapes coated with a copolymer of ethylene and a monomer having a reactive carboxyl group to provide tubing and shielded electrical cable that features enhanced flame retarding characteristics in combination with improved flexibility in conjunction with improved resistance to wrinkling of such materials upon the bending of products utilizing the combination.

More particularly, it has been found that flexible or semi-rigid non-olefinic polymeric materials that heretofor have been unable to be satisfactorily bonded to metal tapes coated with a copolymer of ethylene and a monomer having a reactive carboxyl group can be effectively bonded indirectly thereto by the use of an adhesive deposed between the coating and such materials that is adapted to bond them together. It has been further found that a polyamide based adhesive is particularly advantageous in bonding a broad range of flexible or semi-rigid non-olefinic polymeric materials to such coated tapes.

As used herein, the term "non-olefinic polymeric materials" means olefinic polymers such as polyethylene and polypropylene in which a sufficient number of the available hydrogens have been replaced within the carbon chain and/or pendant thereto with chemical groups such as nitrogen or halogens such as chlorine or fluorine and the like to cause them to be classified as either non-olefinic or amorphic or elastomeric in nature rather than polyolefinic and includes elastomers such as chlorosulfonated polyethylene and elastomers such as polyurethane that contain closed carbon rings in their structure. As such, the term "non-olefinic polymeric materials" includes amorphic polymers such as polyvinyl chloride in which certain of the pendant hydrogen atoms pendant to the olefins carbon chain backbone have been replaced with chlorine atoms as is also the case for polymers such as elastomeric chlorinated polyethylene and also includes polymers such as nylon in which nitrogen atoms are used within the carbon chain backbone as well as elastomers such as chlorosulfonated polyethylene which feature substitutes of both chlorine and sulfur atoms for hydrogen atoms pendant to the olefinic carbon chain backbone.

SUMMARY OF THE INVENTION

It is accordingly an object of this invention to provide a method of bonding flexible or semi-rigid non-olefinic polymeric materials to a flexible metal tape coated with a copolymer of ethylene and a monomer with a reactive carboxyl group so as to provide a bonded construction that minimizes wrinkling of such materials upon the bending of the tape.

It is another object of this invention to provide tubing and shielded electrical cable having improved flexibility and resistance to wrinkling on bending by incorporating a flexible metal tape that is coated on at least one of its sides with a copolymer of ethylene and a monomer with a reactive carboxyl group and to which coating is bonded a flexible or semi-rigid non-olefinic polymeric material.

It is a further object of this invention to provide tubing and shielded electrical cable that are imparted with improved flexibility and flame retardency by incorporating a flexible metal tape that is coated on at least one of its sides with a copolymer of ethylene and a monomer with a reactive carboxyl group and to which coating is bonded a flexible or semi-rigid flame retardant non-olefinic polymeric material.

It is a feature of this invention to provide tubing or shielded electrical cable having improved flexibility and resistance to wrinkling or bending by incorporating a flexible metal tape that is coated on at least one of its sides with a copolymer of ethylene and a monomer having a reactive carboxyl group and to which coating is bonded a flexible or semi-rigid non-olefinic polymeric material by means of a polyamide based adhesive interposed therebetween.

DESCRIPTION OF PREFERRED EMBODIMENT

Figure 1:
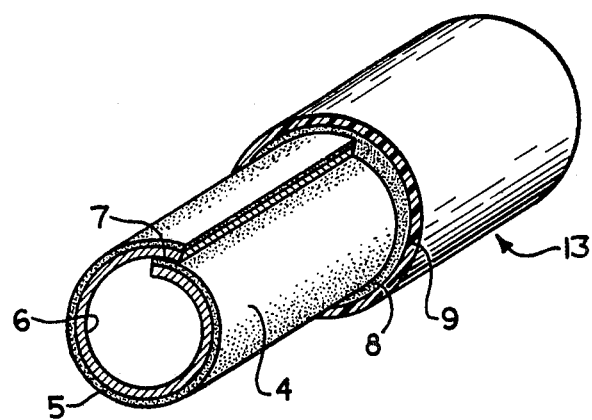
FIG. 1 is a partially cut away perspective view of an embodiment of tubing made in accordance with the invention.

FIG. 1 illustrates an embodiment of tube 13 made in accordance with the invention. Tube 13 has an inner liner in the form of Tape 4 that has been longitudinally folded into a tubular shape having an overlap seam 7. Tape 4 has an inner flexible metal layer 6 and an outer adhesive coating 5. Coating 5 is made from a copolymer of ethylene and a monomer having a reactive carboxyl group such as acrylic acid or an acrylic acid ester. Although in the embodiment shown in FIG. 1, tape 4 has coating 5 only on its outer surface, tape 4 may also have coating 5 on the inner surface where such is desired to provide corrosion and moisture protection to the metal provided that such coating suitably resists the fluid intended to be conveyed through tube 13. Understandably, tape 4 may also have a coating on its inner surface made from a copolymer of ethylene and a monomer have a reactive carboxyl group or from another material if such is desired.

It is to be further understood that tape 4 may be in a spirally wrapped configuration with suitable overlap at its edges in lieu of a longitudinally folded configuration where such is desirable and suitable for the application intended.

Although metal layer 6 may be made from any suitable flexible metal such as steel or an alloy of copper, it is preferred that layer 6 be made from a flexible aluminum alloy. Although the thickness of layer 6 may range from about 3 mils to about 20 mils, it is preferred that the thickness of layer 6 range from about 5 mils to about 15 mils and more preferably from about 8 mils to about 12 mils.

Coating 5 encloses and is bonded to the outer surface of layer 6 and also bonds the inner surface of layer 6 to the outer surface of layer 5 at lap seam 7. Although a lap seam 7 is preferred in the forming of a tubular shape, the edges of tape 4 may be abutted against each other if such is desired provided that the strength of bond between the edges, and as enhanced by any additional layers of materials disposed outwardly of tape 4, is suitable for the purpose intended.

Adhesive layer 8 is disposed between outer protective covering 9 and the outer surface of coating 5 and bonds them together. Covering 9 is made from a flexible or semi-rigid non-olefinic polymeric material, such as polyvinyl chloride or amorphic chlorinated polyethylene, or an elastomeric material such as polyurethane, synthetic rubber, rubber and the like as previously described.

Layer 8 is made from an adhesive adapted to bond coating 5 and covering 9 together. Although layer 8 may be formed by spraying or coating a solvated adhesive onto coating 5 that is adapted to bond it to covering 9, it is preferred that layer 8 be extruded from a hot melt adhesive. A particular adhesive adapted to bond a broad range of flexible or semi-rigid non-olefinic polymeric materials to a coating such as coating 5 made from a copolymer of ethylene and a monomer having a reactive carboxyl group such as acrylic acid or an acrylic acid ester has been found to be a polyamide based adhesive in which the polyamide is derived as a reaction product of diamines and dibase acids. It is further preferred in the use of such polyamide adhesive that an amount of piperazine not to exceed 15% by weight to the total weight of the polyamide be used in the formation of the polyamide based adhesive in order to improve its resistance to hot water. An example of a suitable extrudable hot melt polyamide based adhesive is sold under the Tradename Terlan 1580 by Terrell Corporation. Although the thickness of layer 8 may range from about ½ mil to about 10 mils, it is preferred that the thickness of layer 8 be from about 2 mils to about 5 mils and more preferably from about 2 mils to about 3 mils. Although such polyamide based adhesives may be applied by solvent spraying or coating, as previously described, it is preferred that the polyamide based be extruded as a hot melt.

Thus a preferred embodiment of tubing made in accordance with the invention comprises an 8-12 mil flexible aluminum tape having a thin coating bonded to at least one of its sides that is made from a copolymer of ethylene and a monomer having a reactive carboxyl group such as acrylic acid or an acrylic acid ester, wherein the tape is folded longitudinally into a tubular shape having a lap seam with the copolymer ethylene coating on the outer surface of the metal tape also bonding the edges together at the lap seam and the folded tape is enclosed by an extruded hot melt adhesive, such as a polyamide based hot melt adhesive, which bonds the outer coating to an outer protective covering made from a flexible non-olefinic polymeric material as herein defined that preferably has been compounded for flame retardency.

Figure 2:
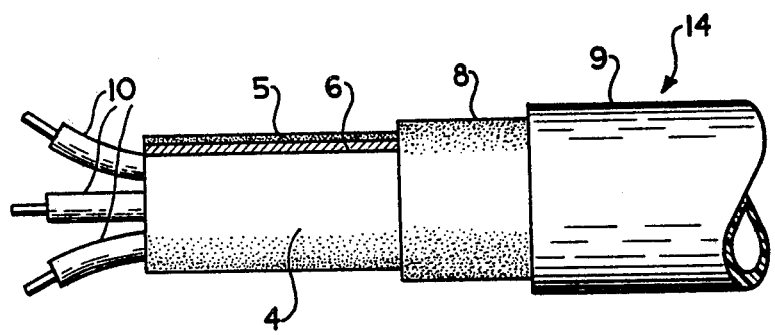
FIG. 2 is a partially cut away side view of an embodiment of an electrical cable made in accordance with the invention.

FIG. 2 illustrates an embodiment of an electrical cable 14 made in accordance with the invention. Cable 14 comprises a plurality of insulated electrical conductors 10 enclosed by previously described tape 4. Tape 4 is folded longitudinally about conductors 10 and, in the view shown on FIG. 2, the previously described metal layer 6 and outer coating 5 are shown at the overlapping edge of tape 4. Disposed about and bonded to coating 5 is adhesive layer 8 that, as previously described, is preferably an extruded hot melt adhesive that preferably contains an amount of piperazine not exceeding 15% by weight to the total weight of the polyamide. Adhesive layer 8 is enclosed by and bonded to previously described protective covering 9 made from a flexible or semi-rigid non-olefinic polymeric material.

Tape 4 provides both an electrical shield and mechanical protection for cable 14 in that conductors 10 are enclosed by metal that can be suitably grounded so as to drain off spurious static electrical noise that might otherwise affect the quality of the electrical signal being transmitted through conductors where such cable is being used for electrical signal transmission purposes. Although FIG. 2 shows tape 4 in adjacent relationship about conductors 10, such is for illustrative purposes only, and intermediate components such as fillers, flame barriers, fibrous or metallic reinforcements and the like may be deposed between tape 4 and conductors 10. Likewise additional layers of fibrous or polymeric material may be disposed outwardly of cover 9 where such is desired.

Figure 3:
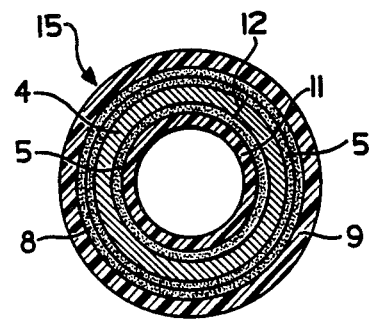
FIG. 3 is an end view of an embodiment of tubing made in accordance with the invention.

FIG. 3 illustrates an embodiment of a tube 15 made in accordance with the invention wherein tape 4 has both of its sides coated with an adhesive made from a copolymer of ethylene and a monomer having a reactive carboxyl group. Shown in FIG. 3 is inner liner 11 made from an olefinic material such as polyethylene. Liner 11 is enclosed by tape 4 that has a coating 5 on both its inner and outer surfaces. Inner coating 5 is disposed between liner 11 and metal layer 6 of tape 4 and bonds them together. Adhesive layer 8 is disposed between outer coating 5 and covering 9 and is adapted to bond them together. Covering 9 is made from a flexible or semi-rigid non-olefinic polymeric material. Tape 4 has abutting edges that meet at point 12 instead of the overlapping seam illustrated in FIGS. 1 and 2. Thus, advantage may be taken by utilizing an inner liner 11 made from an olefinic material such as polyethylene for chemical resistance in conjunction with providing mechanical protection by means of metal layer 6 and providing improved flexibility by bonding to outer coating 5, a flexible cover 9 made from a non-olefinic polymeric material by means of an adhesive disposed therebetween that is adapted to bond cover 9 to coating 5.

Although not illustrated in the Figures, it can be appreciated that variations of the invention include embodiments such as shown in FIG. 2 whereas a plurality flexible polymeric and/or metal tubes, such as previously described in reference to FIG. 1 are used in place of conductors 10 or and that a non-olefinic polymeric material may be used in the place of olefinic liner 11 of FIG. 3 with an additional layer 8 interposed between the outer surface of liner 11 and inner coating 5 and bonding them together.

Following Table I illustrates the relatively poor bond exhibited between flexible non-olefinic polymeric materials as the term is used herein and an 8 mil flexible aluminum tape coated with approximately 2 mils of a copolymer of ethylene and acrylic acid as well as illustrating how well the ethylene copolymer adhesive bonds to a crystalline material such as polyethylene and the marked improvement in bonding achieved when an approximate 3 mil layer of adhesive adapted to bond them together is interposed between the ethylene copolymer adhesive and the flexible non-olefinic materials used for the investigation. All samples were bonded at 275° F. while applying a pressure of 10 P.S.I. The samples were cut into ¼" wide strips and bond level in lb/inch of width was determined by pulling the coated tape in a direction of 180° from the subject materials at a rate of 12 inches per minute at room temperature.

TABLE I

| | | | lb/in width | |
| --- | --- | --- | --- | --- |
| Sample | Material | Nature | Direct to ethylene copolymer coating | 3 mil Terlan 1580 adhesive between coating & subject material |
| 1 | Monomeric plasticized Polyvinyl chloride (compounded for flame retardency) | Amorphic | 0.0 | 16.6 |
| 2 | Nylon | Non-olefinic | 0.6 | 2.6 |
| 3 | Chlorinated Polyethylene | Elastomeric | 0.4 | 13.6 |
| 4 | (Chlorosulfonated Polyethylene) | Elastomeric | 0.4 | 10.4 |
| 5 | Thermoplastic Polyurethane (polyether base) | Elastomeric | 0.0 | 16.0 |
| 6 | Polyethylene (Low Density) | Olefinic | 4.6 | 0.6 |
| 7 | Polyvinyl chloride-ethylene vinyl acetate graft copolymer | Amorphic | 0.4 | 17.2 |
| 8 | Thermoplastic Polyester | Elastomeric | 0.0 | 2.8 |
| 9 | Fluorinated Hydrocarbon | Non-olefinic | 0.0 | 0.4 |

Sample 1 is a flexible flame retardant polyvinyl chloride compound sold under the number 202 FRCSA by the Panasote Company. Sample 2 is a flexible type 6 nylon sold under the tradename Capron by Allied Chemical Company. Sample 3 is a flexible flame retardant radiation crosslinkable compound of elastomeric chlorinated polyethylenes. Sample 4 is a flexible, flame retardant, radiation crosslinkable chlorosulfonated polyethylene compound. Sample 5 is a flexible polyester based polyurethane formerly sold under the tradename Roylar A 863 by the Uniroyal Company. Sample 6 is a low density polyethylene sold under the tradename Alathon 1250 BK 40 by the E. I. dePont de Nemours Company. Sample 7 is a flexible EVA-PVC graft copolymer compound sold under the number 1131 by the Pantasote Company. Sample 8 is a flexible thermoplastic polyester sold under the tradename Hytrel 6345 by the E. I. duPont de Nemours Company. Sample 9 is a flexible polyvinylidene fluoride polymer sold under the tradename Kynar by the Pennwalt Corporation.

The above data illustrates a surprising increase in bond level achieved between a non-olefinic material as the term is used herein and a coating made from a copolymer of ethylene and a monomer having a reactive carboxyl group such as acrylic acid or an acrylic acid ester by interposing therebetween a polyamide based adhesive such as Terlan 1580. It is also interesting to note that the addition of a polyamide based adhesive actually lessened the bond between the coating and an olefinic material such as the polyethylene used in Sample 6.

In a preferred method of making tubing or shielded electrical cable in accordance with the invention a flexible metal tape of indeterminate length having a coating of a copolymer of an ethylene and a monomer having a reactive carboxyl group is folded longitudinally into a tubular form by a suitable guide such that the coating is on the outside and the edges of the tape overlap to form a lap seam having the coating interposed therebetween. The lap seam is then bonded by the use of an amount of heat sufficient to soften the coating. A suitably heated hot melt adhesive that is adapted to bond the coating to a flexible or semi-rigid non-olefinic polymeric material, such as polyamide based adhesive, is then extruded about the folded tape which may, by its heat alone, provide sufficient heat to create the previously described bond at the lap seam. A flexible non-olefinic polymeric covering is then extruded about the adhesive and is bonded to the ethylene copolymer coating by means of the adhesive. The covered tube or shielded electrical cable is then cooled to room temperature by suitable means, such as water, afterwhich the tubing or shielded electrical cable is either subjected to some further manufacturing step if such is required or cut into determinate lengths for use in desired applications.

The flexible or semi-rigid non-olefinic polymeric materials used in accordance with the invention include both thermoplastic and cross-linkable versions of such materials. For example, covering 9 may be extruded from an amorphic thermoplastic polyvinyl chloride or chlorosulfonated polyethylene elastomer that is compounded to be cured either by chemical means or exposure to radiation such as in the form of high speed electrons. Although it is preferred that the flexible or semi-rigid non-olefinic polymeric materials used in accordance with the invention be extruded to provide the covering that is bonded to the coating of the copolymer of ethylene and a monomer having a reactive carboxyl group, such materials may be applied by other means such as by coating or wrapping when such materials are in the form of a tape.

Although a monomeric plasticized polyvinyl chloride may be used as a non-olefinic material in accordance with the invention, best results in terms of resistance to heat up to 200° F. have been realized where a polymeric plasticizer is used in preference to a monomeric plasticizer.

What is claimed is:

1. A shielded electrical cable having improved flexibility and resistance to wrinkling on bending, said cable comprising:
   (a) at least one insulated electrical conductor;
   (b) a flexible metal tape disposed in emcompassing relationship in the form of a shield about the electrical conductor;
   (c) a coating of a copolymer of ethylene and a monomer having a reactive carboxyl group disposed on at least the outer surface of the shield;
   (d) a covering disposed in emcompassing relationship about the coated shield, said covering made from a flexible or semi-rigid non-olefinic polymeric material; and
   (e) an adhesive disposed intermediate the shield coating and the covering and adapted to bond them together.

2. The cable of claim 1 wherein the adhesive that is adapted to bond the coating to a flexible or semi-rigid non-olefinic polymeric material is a polyamide based adhesive in which the polyamide is derived as the reaction product of diamines and dibasic acids.

3. The cable of claim 2 wherein the polyamide based adhesive contained not more than about 15% by weight of piperazine to the total weight of polyamide in its formation.

4. The cable of claim 1 wherein the monomer is acrylic acid or an acrylic acid ester.

5. The cable of claim 1 wherein the adhesive is an extruded hot melt adhesive.

6. The cable of claim 1 wherein the shield is in a longitudinally folded configuration.

7. The cable of claim 1 wherein the shield is in a spiralled configuration.

8. The cable of claim 6 wherein the longitudinally folded configuration includes a lap seam formed by overlapping edges of the tape and the overlapping edges are bonded together by the coating.

9. The cable of claim 1 wherein the metal is an aluminum alloy.

10. The cable of claim 1 wherein the flexible or semi-rigid non-olefinic material is a material selected from the group consisting of polyamide, polyvinyl chloride, polyurethane, halogenated polyethylene, thermoplastic polyester, vinylidene fluoride and chlorosulfonated polyethlylene polymers.

11. The cable of claim 10 wherein the halogenated polyethylene is a chlorinated polyethylene.

12. The cable of claim 10 wherein the halogenated polyethylene is a chlorinated fluorocarbon.

13. The cable of claim 1 wherein the non-olefinic polymeric material is a flame retardant non-olefinic polymeric material.

* * * * *